(No Model.) 6 Sheets—Sheet 1.

W. E. NICKERSON.
AUTOMATIC WEIGHING MACHINE.

No. 555,393. Patented Feb. 25, 1896.

WITNESSES
Frank H. Parker.
Edward S. Day

INVENTOR
William Emery Nickerson (No Model.) 6 Sheets—Sheet 2.
W. E. NICKERSON.
AUTOMATIC WEIGHING MACHINE.

No. 555,393. Patented Feb. 25, 1896.

WITNESSES
Frank G. Parker.
Edward S. Day

INVENTOR
William Emery Nickerson (No Model.) 6 Sheets—Sheet 3.

W. E. NICKERSON.
AUTOMATIC WEIGHING MACHINE.

No. 555,393. Patented Feb. 25, 1896.

WITNESSES
Frank G. Parker.
Edward S. Day

INVENTOR
William Emery Nickerson (No Model.)

6 Sheets—Sheet 4.

W. E. NICKERSON.
AUTOMATIC WEIGHING MACHINE.

No. 555,393. Patented Feb. 25, 1896.

WITNESSES
Frank G. Parker.
Edward S. Day

INVENTOR
William Emery Nickerson (No Model.) 6 Sheets—Sheet 5.
W. E. NICKERSON.
AUTOMATIC WEIGHING MACHINE.

No. 555,393. Patented Feb. 25, 1896.

WITNESSES
Frank G. Parker.
Edward S. Day

INVENTOR
William Emery Nickerson (No Model.)  6 Sheets—Sheet 6.

W. E. NICKERSON.
AUTOMATIC WEIGHING MACHINE.

No. 555,393.  Patented Feb. 25, 1896.

WITNESSES
Frank G. Parker
Edward S. Day

INVENTOR
William Emery Nickerson

UNITED STATES PATENT OFFICE.

WILLIAM EMERY NICKERSON, OF CAMBRIDGE, MASSACHUSETTS.

AUTOMATIC WEIGHING-MACHINE.

SPECIFICATION forming part of Letters Patent No. 555,393, dated February 25, 1896.

Application filed April 29, 1895. Serial No. 547,524. (No model.)

*To all whom it may concern:*

Be it known that I, WILLIAM EMERY NICKERSON, of Cambridge, in the county of Middlesex and State of Massachusetts, have invented a new and useful Improvement in Automatic Weighing-Machines, of which the following, taken in connection with the accompanying drawings, is a specification.

My invention relates to an automatic weighing-machine of that class which is adapted to weigh a stream of granular or other material.

It consists of several novel and co-operating devices, whereby accuracy of weighing and simplicity of construction are attained.

My improved machine is illustrated in the accompanying drawings, in which—

Figure 1:
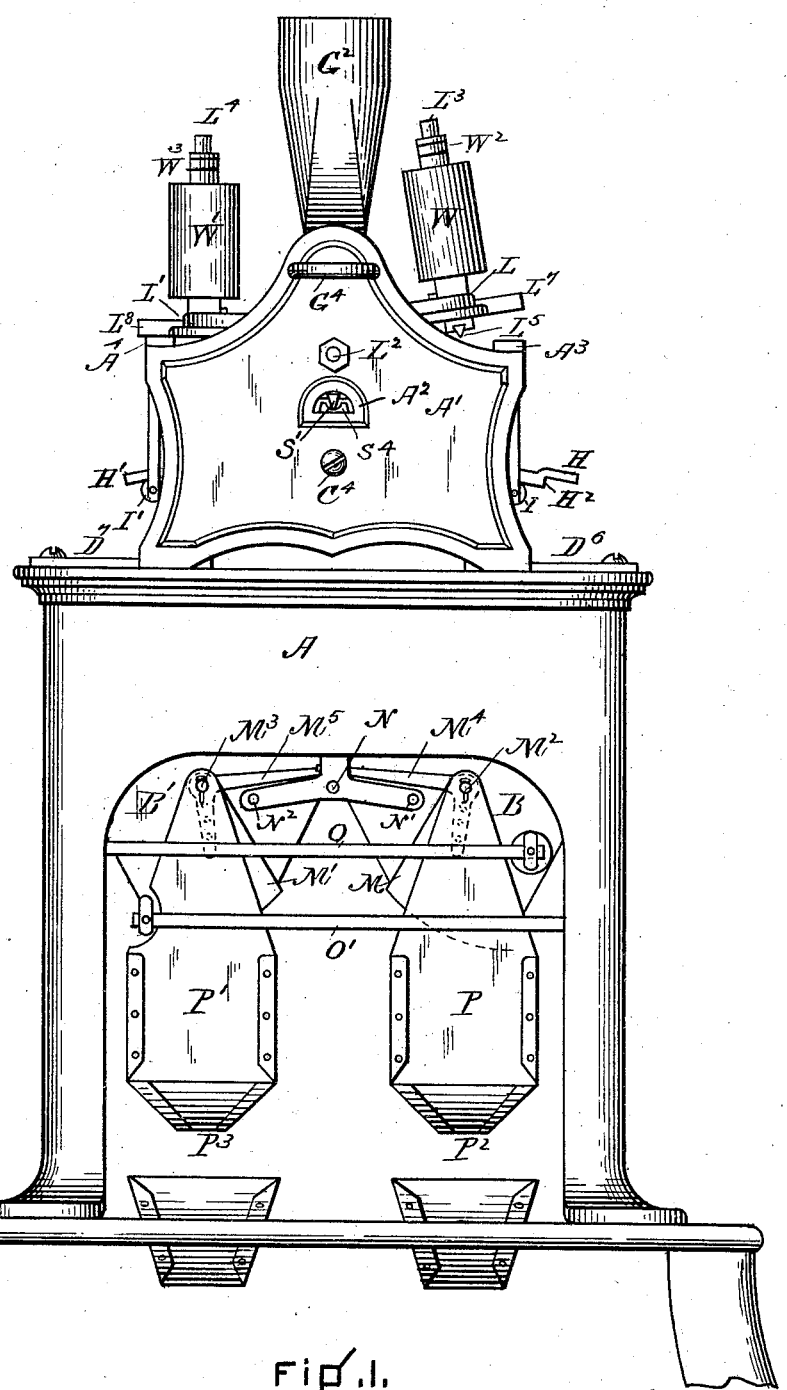
Figure 2:
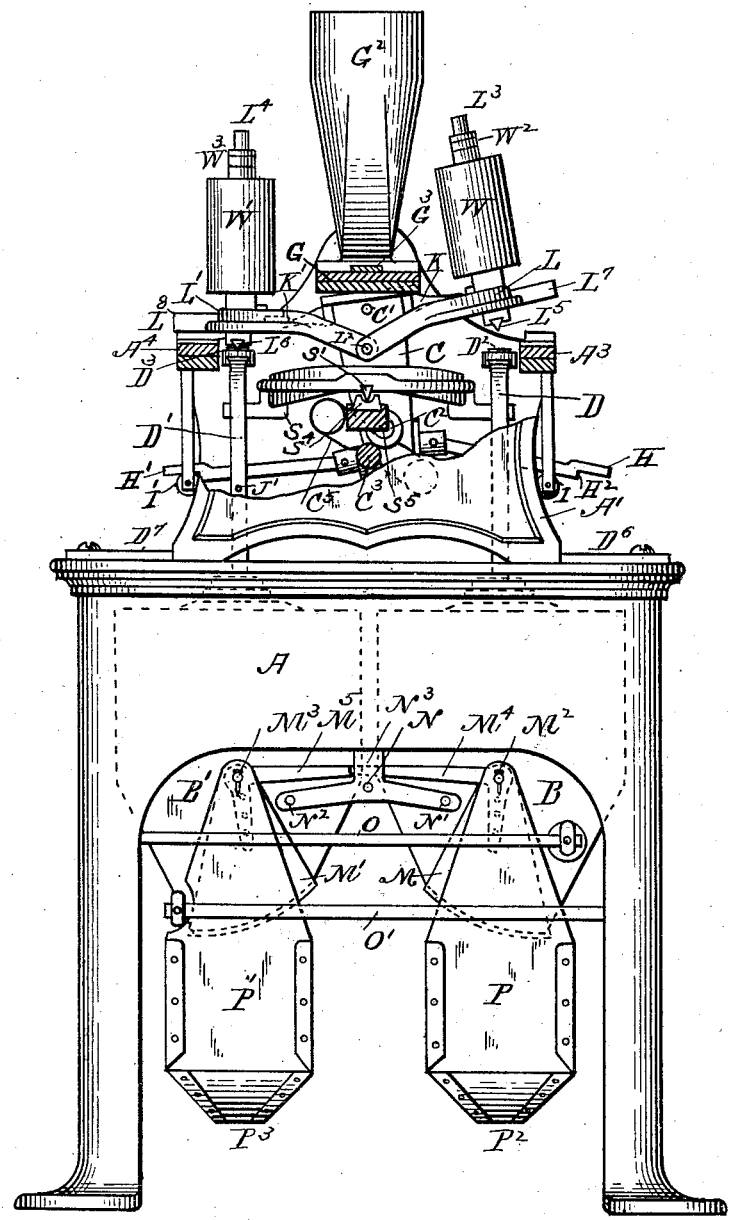
Figure 3:
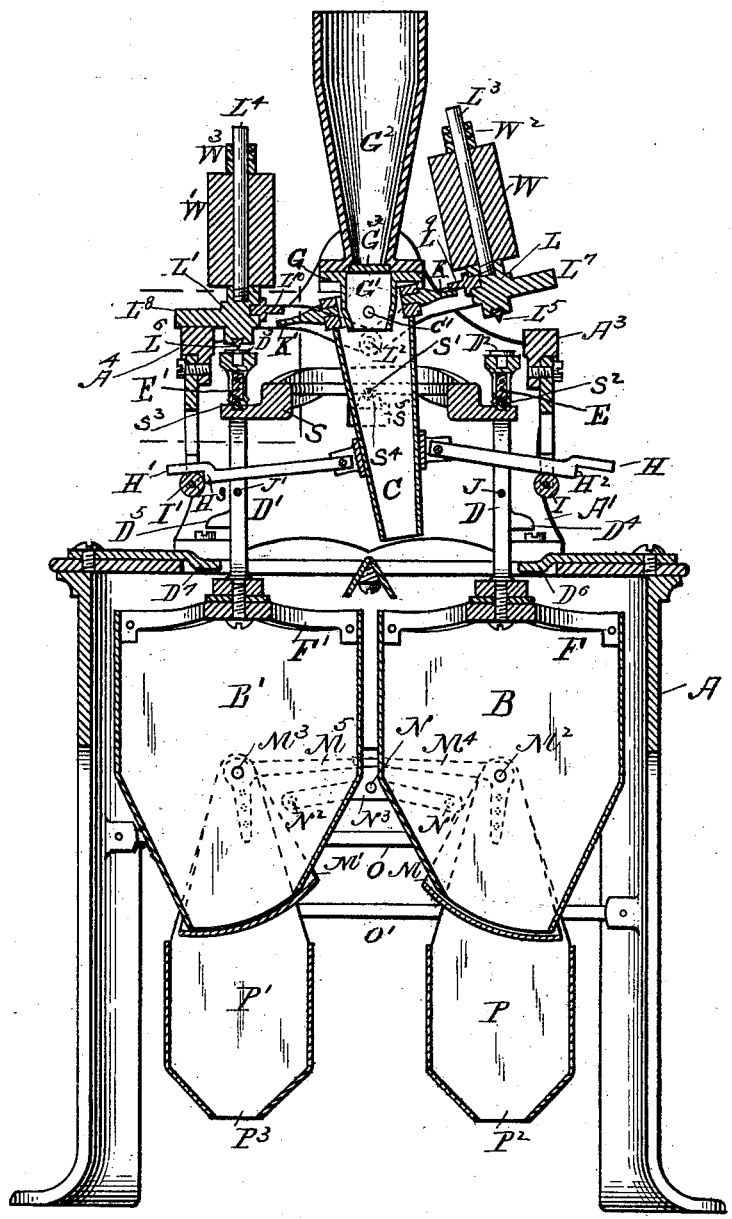
Figure 4:
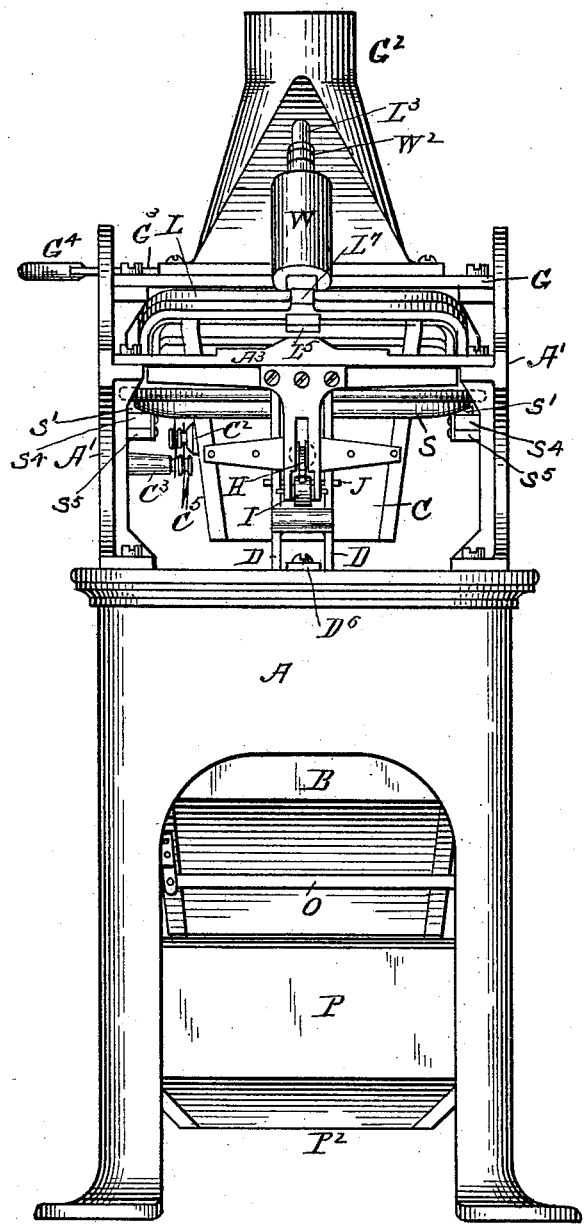
Figure 5:
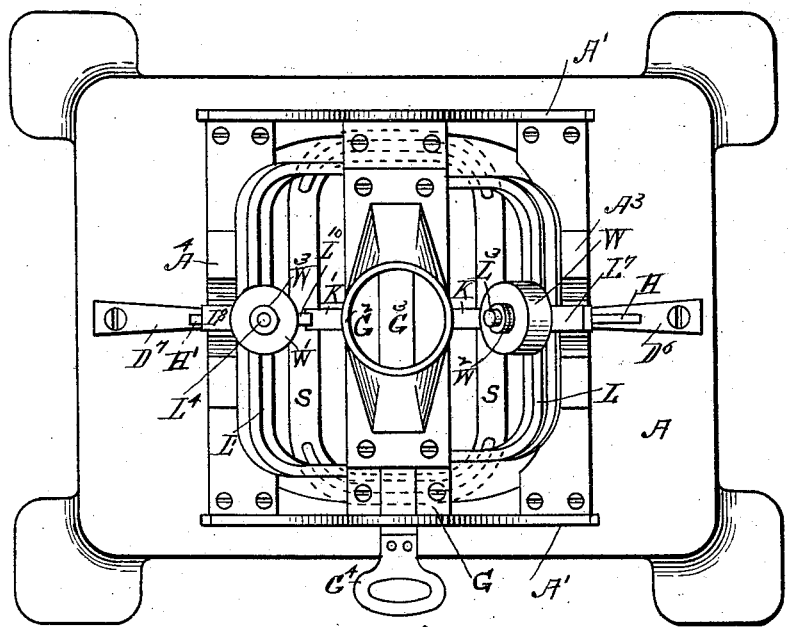
Figure 6:
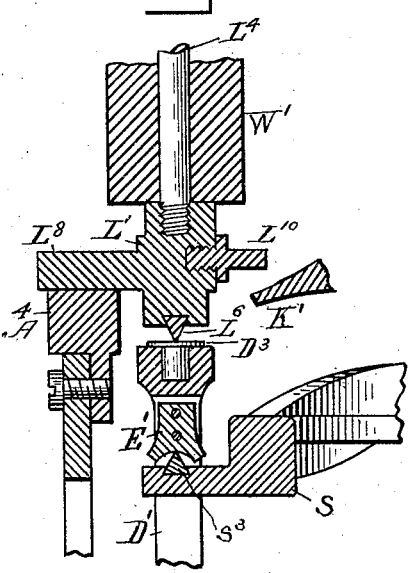
Figure 7:
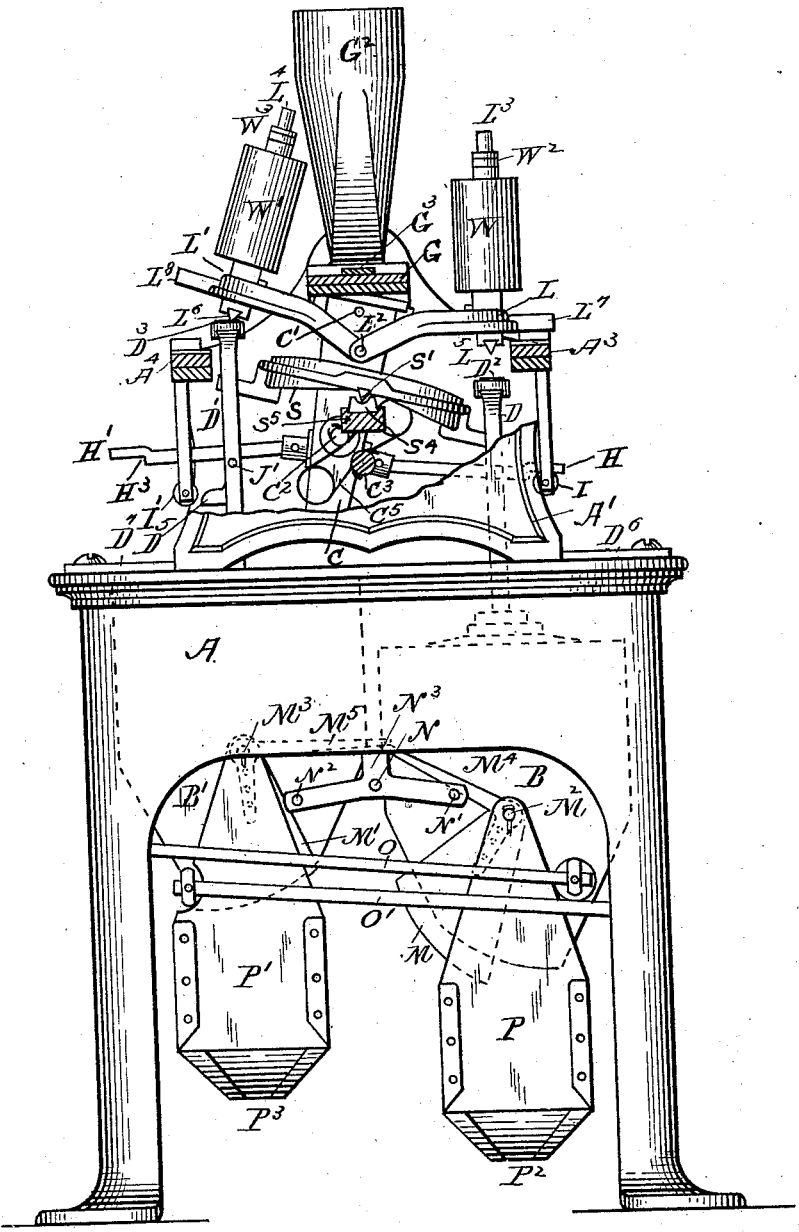

Figure 1 is a front elevation. Fig. 2 is also a front elevation, but with a portion of the upper framework broken away to show the scale-beam and immediate parts. Fig. 3 shows the machine in vertical section. Fig. 4 is a side elevation. Fig. 5 is a plan. Fig. 6 shows a portion enlarged. Fig. 7 shows the machine in the act of discharging a loaded bucket, a part of the framework being broken away, as in Fig. 2.

In the drawings, A represents the principal framework of the machine, and A' the top frame upon which the scale-beam, weight-arms, chute and immediately-connected parts are supported.

The scale-beam S is made in the shape preferably of an oval or elliptical ring (see Fig. 5) in order to allow room along the perpendicular central line of the machine for the swinging chute C, (by which the material to be weighed is delivered to the buckets,) and has for a central fulcrum the knife edges S' and S', one of which is shown in Figs. 1, 2, and 7 and the other in dotted lines in Fig. 3. The scale-beam S is provided with two other knife edges $S^2$ and $S^3$, located at the right and left extremities, respectively, which serve for supports or bearing-points for the buckets B and B', respectively, Fig. 3. The buckets B and B' depend from the knife edges $S^2$ and $S^3$, by means of the standards D and D', which carry the knife-edge blocks E and E', and are firmly secured by the spider-frames F and F' to their respective buckets, Fig. 3. The central knife edges S' S' of the scale-beam S bear upon the knife-edge blocks $S^4$ $S^4$, located on the inwardly-projecting parts $S^5$ $S^5$ of the frame A'. The opening $A^2$ in the frame A', Fig. 1, is provided for convenience in the mechanical operation of setting the knife-edge block $S^4$ into projecting piece $S^5$ of the frame. There is a similar opening in the back of the frame A'. (Not shown in the drawings.)

Extending from front to back at the upper part of the framework A' is the flat piece G, provided with an opening (here shown closed by a shut-off slide) and with the downwardly-projecting hollow part G', Fig. 3. Upon the piece G is placed the conveying-tube $G^2$, connecting with a bin or other supply of material to be weighed. To the part G', by means of the pins C' C', is attached the chute C in such a manner as to be free to swing over one weighing-bucket or the other when so actuated.

The chute C swings within the oval opening in the scale-beam S and is provided on either side with the latches H and H', which are pivoted to itself and engage, by means of the shoulders $H^2$ and $H^3$, with the rollers I and I', respectively. These latches H and H' are alternately lifted and disengaged from their respective rollers I and I' by engaging with the pins J and J' located in the standards D and D', in a manner hereinafter to be described. The chute C is also provided on either side at its upper part with the strong projecting arms K and K', whose function will hereinafter appear.

Directly above the scale-beam S are located two weight-arms L and L', one on either side of the chute. The plan of these weight-arms L and L' shows them of a semi-oval shape, surrounding the chute. They are pivoted independent of each other on the pins $L^2 L^2$, about which they have a limited movement in a vertical plane when actuated. They carry on their upper sides the weight-standards $L^3$ and $L^4$, which hold in position the principal weighing-weights W and W' and the small adjusting-weights $W^2$ and $W^3$, respectively. The weight-arms L and L' are further provided on their under sides with the knife edges $L^5$ and $L^6$, which bear alternately on the hardened steel caps $D^2$ and $D^3$, fixed into the tops of the standards D and D', respectively, Fig. 6. The pivotal pins $L^2 L^2$ of the weight-arms L and L' are firmly attached to the upper frame A' by threads and nuts, one at the front and one at the back of the machine, and are so located as to be directly over the knife-blocks $S^4 S^4$ of the scale-beam S, and at a distance above the edge of the fulcrum-knives $S' S'$ equal to that which the surface of the cap-pieces $D^2$ and $D^3$ are above the edge of the knives $S^2$ and $S^3$, respectively. The weight-arms L and L' are further provided with the projections $L^7$ and $L^8$, which engage with the cross-beams $A^3$ and $A^4$ and prevent the weight-arms from dropping below a certain predetermined position.

The mass of material in the weight-arms L and L' and the weights W and W' is so distributed preferably that the center of gravity of each weight and arm, taken as a whole, shall be nearly over its knife edge $L^5$ or $L^6$, respectively, when the weight-arms are in their lowest position, viz: when the projections $L^7$ and $L^8$ are rising upon the cross-beam $A^3$ and $A^4$, respectively. This is preferred, since under these conditions the friction of the arms on the pivotal pins $L^2 L^2$ is reduced to a minimum.

The chute C, in addition to what has been already specified, is provided upon its front side with a stud $C^2$, Figs. 2 and 4, having an encircling groove near its outer end, and which, in connection with a similar stud $C^3$, (secured to the frame A' at a slightly lower level than the stud $C^2$ by the screw $C^4$, Fig. 1,) serves as a means of attachment for the wire spring $C^5$. The spring $C^5$ impels the chute C to travel the full length of its oscillation on either side of the center, and thereby assists in causing the latches H and H' to properly engage with the rollers I and I'.

The standards D and D' are provided with the projecting pieces $D^4$ and $D^5$, Fig. 3, which serve to limit the downward movement of the standards and buckets by engaging with the stop-pieces $D^6$ and $D^7$, respectively. The piece G is provided with a shut-off slide $G^3$, which carries in front the handle $G^4$, Fig. 5, and serves to stop the machine by shutting off the supply of material to be weighed. The weight-arms L and L' are provided with the arms $L^9$ and $L^{10}$, which serve to engage with the arms K and K', whereby the chute is actuated by the weight-arms and the weight-arms supported by the chute alternately.

The buckets B and B' are provided with the discharge-doors M and M', pivoted upon the pins $M^2$ and $M^3$, respectively. The doors M and M' have arms $M^4$ and $M^5$, which are adapted to engage with the pins N and N' and $N^2$, located in the supporting-piece $N^3$, upon the descent of a bucket, and thereby cause the respective door to swing open. The buckets are also provided with the pivoted guiding-arms O O O and O' O' O', which hold them from swinging without interfering in their limited vertical movement. All of the arms O O O are shown in one or another of the drawings, but one of the arms O' (the lateral one) is not shown in any of the views.

The doors M and M' are curved in such a manner as to be eccentric with the pivotal points $M^2$ and $M^3$, whereby as the door opens its parts remove from the lower edges of the bucket, so that particles of the material being weighed do not bind or clog the opening movement.

Depending from the buckets B and B' are the supplementary or retarding buckets P and P', whose discharge-orifices $P^2$ and $P^3$ are somewhat smaller in capacity than those of the discharge-doors, whereby a portion of the load remains long enough in the supplementary bucket to prevent the main buckets from rising too quickly and thereby retain some of the material by the premature closing of the doors.

Starting with the machine in the position shown in Figs. 2 and 3, the operation is as follows: The bucket B' is empty and the chute C is directed toward the bucket B which is filling. The latter is prevented from descending until a definite load is reached by the resistance of the weight-arm L' and weight W' on the end of the scale-beam opposite the bucket B. As soon, however, as a definite amount has run into the bucket B it begins to descend, and the weight-arm L' and the weight W' begin to rise. The resistance of the weight-arm L' and weight W' decreases as the upward movement progresses, since the common center of gravity of the arm and weight is approaching the perpendicular over the pivotal pins $L^2 L^2$. Thereby the bucket B is allowed to descend with increasing power. After the descent of the bucket B and corresponding ascent of the bucket B' has progressed sufficiently, the pin J' in the bucket-standard D' engages with the latch H'. The latter on being slightly raised trips over the roller I', and the chute C is swung across over the bucket B' impelled by the weight-arm L and weight W, which were being supported by the arm K. As the chute swings across impelled as above, the arm K' overtakes the arm L', carrying it upward, freeing the beam S from the resistance of the arm L' and weight W', and thus allowing the bucket B to descend freely, and in so doing to cause the door M to open through the contact of the arm $M^4$, first with the pin N and later with the pin N', whereby the load in the bucket B is allowed to discharge. When the bucket B has reached its lowest point, the weight-arm L' has been raised high enough to allow the chute C, assisted by the spring $C^5$, to swing far enough to the left to cause the latch H to lock with the roller I, and thereby (acting through the chute) support the weight-arm L' upon the arm K' until the descent of the bucket B'. In the meantime, the weight-arm L has come to rest on the cross-bar $A^3$, and is ready to balance a definite amount of load in the bucket B'. The opening of the door M allows the material to drop into the supplementary bucket P, in which an amount sufficient to hold the bucket B down remains long enough to prevent the door M from retaining any of the load, which latter would happen if the bucket should rise prematurely. The machine is now in the position shown in Fig. 7. After the load has run out of the supplementary bucket P, the bucket B rises and B' correspondingly descends, and the machine comes again into the position shown in Figs. 2 and 3, except that the chute C is delivering into the bucket B' and the positions of the two weight-arms and attached parts are reversed, viz: the parts on the right side occupying the same relative positions which those on the left did at the start, and vice versa. The bucket B' and related parts now go through the same evolutions which the bucket B has completed, and so on, the machine automatically and continuously delivering definite amounts of material from each bucket alternately.

It is obvious that the arm L and the weight W might consist of one and the same piece of metal, and be considered, taken as a whole, as the arm L without departing from the spirit of the invention.

The several novel devices and improvements in my machine may be briefly enumerated as follows: In the adaptation of the weighing-weights to turn upon a center, whose location above the central knife edge of the weighing-beam is equal to the distance between the outer knife edges of the weighing-beam and the contact-point of the weighing-weights, whereby a sliding motion is avoided at said contact, and one of rocking alone obtained; in the utilization of the weighing-weights to alternately shift the swinging spout through which the material to be weighed is delivered to the weighing-buckets; in supporting the inactive weight by a trip device, adapted to be released on the movement of the scale-beam when a definite load is reached; in placing the center of gravity of each weighing-weight and its arm above the engaging point, whereby said center of gravity rapidly approaches the perpendicular over the pivotal point, and the weight offers a decreasing resistance as the beam moves under the full load; in the shifting-spout as an intermediate link between inactive weighing-weight and the trip device; in the use of a spring to aid in throwing the swinging spout out of contact with the active weight at each descent of a bucket; in the peculiar construction of the latch device; in placing the center of gravity of the weighing-weight approximately over its bearing-point upon the stem of the weighing-bucket, whereby the friction on the pivotal pins is reduced to a minimum, and, lastly, in a scale-beam of a ring shape, whereby the delivering-chute may be centrally located.

I claim—

1. In a weighing-machine, the weights W and W', arms L and L' and pins $L^2 L^2$, said pins being located directly over the fulcrum of the scale-beam S; in combination with the scale-beam S, buckets B and B' and chute C, said chute being adapted to oscillate alternately over the said buckets, substantially as and for the purpose set forth.

2. In a weighing-machine, the weights W and W', arms L and L' and pins $L^2 L^2$, the center of gravity of said weights and arms (each arm and its respective weight taken as a whole) being above the said pins, whereby the resistance of said weights and arms decreases rapidly as they rise; in combination with the scale-beam S, buckets B and B' and chute C, said chute being adapted to oscillate alternately over the said buckets, substantially as and for the purpose set forth.

3. In a weighing-machine, the weights W and W', arms L and L' and pins $L^2 L^2$, the center of gravity of each of said arms with its weight, taken as a whole, being nearly perpendicular over the point of engagement between the said arms and the scale-beam S, whereby the friction of the said arms on the said pins is reduced to a minimum; in combination with the scale-beam S, buckets B and B' and chute C, said chute being adapted to oscillate alternately over said buckets, substantially as and for the purpose set forth.

4. In a weighing-machine, the weights W and W', arms L and L', chute C and mechanism for connecting said chute with said arms, whereby said chute is alternately impelled by said weights; in combination with the scale-beam S, buckets B and B' and necessary connecting mechanism, substantially as and for the purpose set forth.

5. In a weighing-machine, the weights W and W', arms L and L', chute C and latches H and H'; in combination with the scale-beam S, buckets B and B' and connecting mechanism, substantially as and for the purpose set forth.

6. In a weighing-machine, the ring-shaped scale-beam S and buckets B and B'; in combination with the chute C adapted to oscillate within the opening of the ring-shaped scale-beam, and the weights W and W' and mechanism for connecting and operating the weights and chute, substantially as and for the purpose set forth.

7. In a weighing-machine, the scale-beam S and buckets B and B'; in combination with the weights W and W', arms L and L', pins $L^2 L^2$, projections $L^7$ and $L^8$, cross-beams $A^3$ and $A^4$, arms $L^9$ and $L^{10}$, arms K and K', chute C, latches H and H', rollers I and I' and pins J and J', substantially as and for the purpose set forth.

8. In a weighing-machine, the scale-beam S having the knife edges S' S' and $S^2$ and $S^3$, buckets B and B', chute C and appropriate connecting mechanisms; in combination with the weight-arms L and L' provided with edges $L^5$ and $L^6$, and pivoted on the pins $L^2 L^2$, and the pins $L^2 L^2$, said pins being located the same distance above the edges of the knives S' S', as the edges $L^5$ and $L^6$ are above the edges $S^2$ and $S^3$ respectively, whereby on a movement of the scale-beam S, and consequent movement of one or the other of the weight-arms L and L', the edges L⁵ and L⁶ have no sliding movement upon their bearing-surfaces, but one of relative rocking only, substantially as and for the purpose set forth.

9. In a weighing-machine, the scale-beam S, buckets B and B', chute C and necessary connecting mechanism; in combination with weighing-weights adapted to engage with said scale-beam, said weights being independently mounted upon movable arms, and said arms and connecting mechanism, substantially as and for the purpose set forth.

10. In a weighing-machine the scale-beam S, buckets B and B', weights W and W'; in combination with the chute C, spring C⁵ and connecting mechanisms, substantially as and for the purpose set forth.

In testimony whereof I have signed my name to this specification, in the presence of two subscribing witnesses, on this 27th day of April, A. D. 1895.

WILLIAM EMERY NICKERSON.

Witnesses:
FRANK G. PARKER,
EDWARD S. DAY.